Jan. 23, 1923. 1,442,915.
L. F. VOSBURGH.
RAILWAY TICKET STRUCTURE.
FILED SEPT. 19, 1921.
5 SHEETS—SHEET 1.
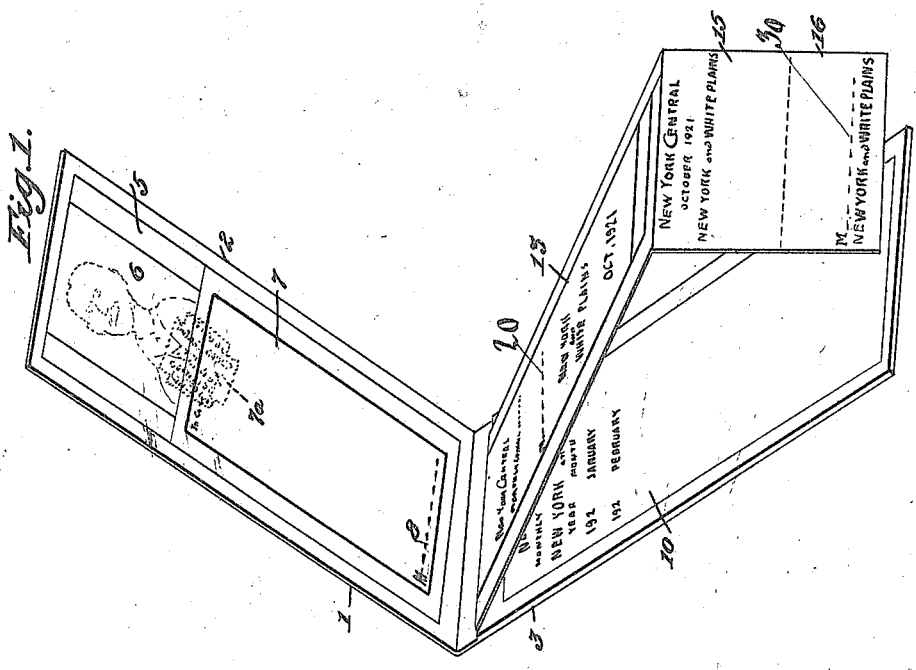
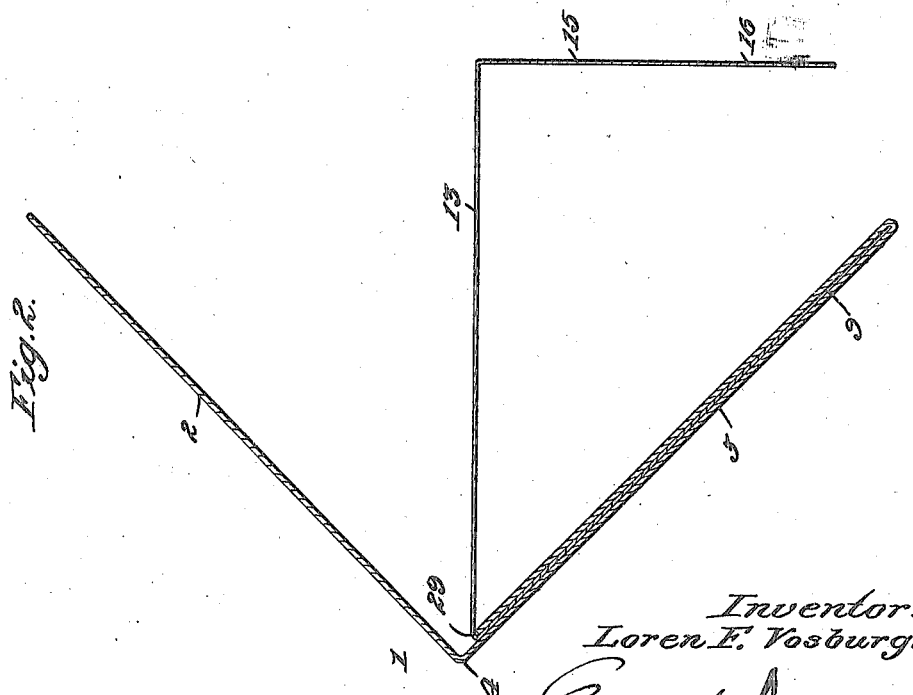
Inventor:
Loren F. Vosburgh, Jan. 23, 1923.
L. F. VOSBURGH.
RAILWAY TICKET STRUCTURE.
FILED SEPT. 19, 1921.
1,442,915.
5 SHEETS—SHEET 2.
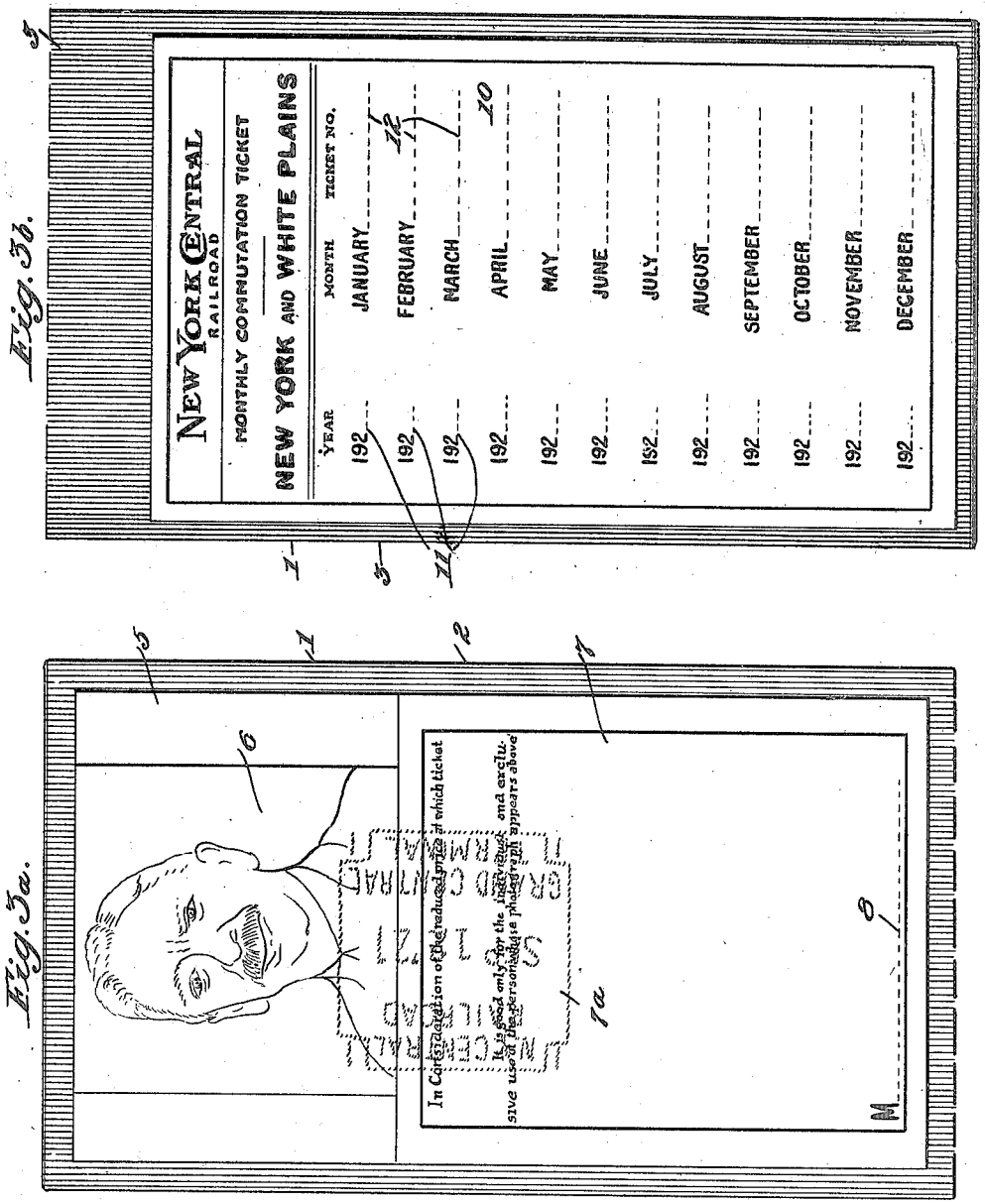
Inventor:
Loren F. Vosburgh, Jan. 23, 1923. 1,442,915.
L. F. VOSBURGH.
RAILWAY TICKET STRUCTURE.
FILED SEPT. 19, 1921.
5 SHEETS—SHEET 3.

Inventor:
Loren F. Vosburgh.

Jan. 23, 1923.
L. F. VOSBURGH.
RAILWAY TICKET STRUCTURE.
FILED SEPT. 19, 1921.
1,442,915.
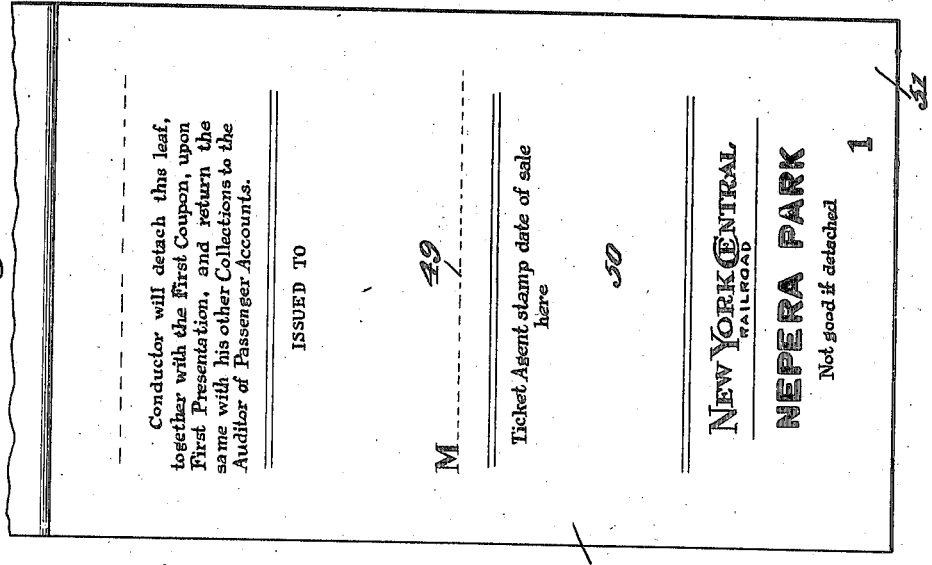
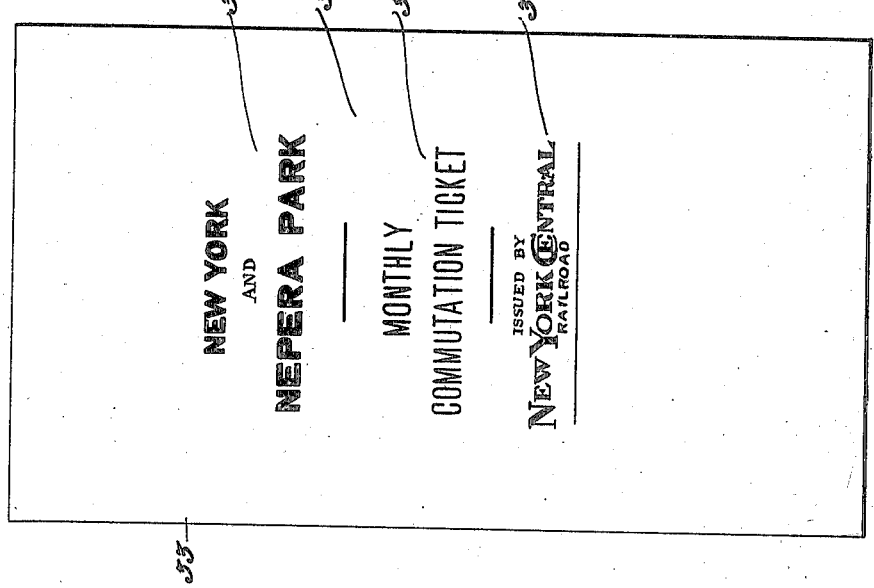
Inventor:
Loren F. Vosburgh,
Atty.

Jan. 23, 1923.

L. F. VOSBURGH.
RAILWAY TICKET STRUCTURE.
FILED SEPT. 19, 1921.

AGENT'S STUB

Not Good for Passage

To be detached when ticket is sold

Monthly Commutation Ticket

M ........................

BETWEEN

NEW YORK
AND
NEPERA PARK

Fig. 6.

NEW YORK CENTRAL RAILROAD

MONTHLY COMMUTATION TICKET

This ticket good only when presented in connection with cover bearing photograph and signature of M ........................
(To be signed by purchaser)

For the Individual and Exclusive use of purchaser (FEMALE) whose signature is affixed to contract on inside of front cover for .......... single continuous rides in either direction.

Between

NEW YORK
AND
NEPERA PARK

| Jan. | July | 1921 |
| Feb. | Aug. | 1922 |
| Mar. | Sept. | 1923 |
| Apr. | Oct. | 1924 |
| May. | Nov. | 1925 |
| June | Dec. | |

Good only for passage during the month and in the year punched out in margin hereof.

Conductor will lift this ticket for last ride.

Coupons include Elevated service only when wholly used on Putnam Division.

General Passenger Agent.

Inventor:
Loren F. Vosburgh,

Att'y.

Patented Jan. 23, 1923.

1,442,915

UNITED STATES PATENT OFFICE.

LOREN F. VOSBURGH, OF MOUNT VERNON, NEW YORK.

RAILWAY-TICKET STRUCTURE.

Application filed September 19, 1921. Serial No. 501,837.

*To all whom it may concern:*

Be it known that I, LOREN F. VOSBURGH, a citizen of the United States, residing at 17 Rich Avenue, Mount Vernon, N. Y., in the county of Westchester and State of New York, have invented certain new and useful Improvements in Railway - Ticket Structures, of which the following is a specification, reference being had therein to the accompanying drawing.

This invention relates to a railway ticket structure.

The principal railroads of this country, which handle suburban passenger business into commercial centers such as New York, Boston, etc., have more or less difficulty in preventing the loaning or trafficking in commutation tickets, which are sold at a very low rate per mile, such trafficking resulting in considerable loss of revenue to the railroads. As a preventive measure, various protective instrumentalities have been proposed; but these either involve a complicated form of ticket, or impractical identifying media.

The object of the present invention is to provide a novel but very simple structure whereby tickets sold to a passenger cannot be utilized by anyone other than the actual purchaser.

Another object within the contemplation of my invention is the provision of a ticket-holder adapted for continuing use and in which may be inserted, each month, say, a commutation ticket which may be of such type as to be an essential component of the entire structure: That is to say, I provide a holder and a ticket, the latter being replaceable in the holder from time to time, but there being substance-matter both on the holder and on the ticket whereby an identifying relation is created and maintained between these two components after the original issuance of the holder and the subsequent purchase of the monthly tickets which are insertable therein.

With these and other objects in view, the invention resides essentially in two components, one a holder and the other a ticket, the two being so constructed as to be associable and each bearing markings common to the other, whereby a definite relation for purposes of identification may be established and maintained. In other words, the invention comprises a combined ticket and holder such as those illustrated, by way of examples, in the accompanying drawings; it being understood that these drawings are mere exemplifications and that both the holder-component and the ticket- component are susceptible of a wide range of modification and variation without departing from the spirit of the invention or sacrificing any of its salient features or underlying principles.

In these drawings:

Figure 1 is a view, in perspective, of the holder with a ticket inserted therein; the holder being shown as partly open, and the ticket appearing in a raised position more clearly to illustrate certain substance-matter appearing on the inner faces of the holder;

Fig. 2 is a view in central longitudinal section of the holder and ticket, both full-size and partially open;

Figs. 3$^a$ and 3$^b$ are face views of the two cover-members of the holder, the ticket being omitted;

Figs. 4$^a$ and 4$^b$ are similar views of the ticket, by itself, and showing its form and certain identifying substance-matter printed thereon; and Figs. 5, 6, 6$^a$ and 7 are face views of the several elements of a modified form of ticket, but with similar identifying substance-matter thereon.

Referring to these drawings, the reference-numeral 1 designates, in general, the holder or holder-component, preferably of book-form and comprising two cover-members 2 and 3 and a connecting hinge-section 4. The holder may be of any required material, form and dimensions.

The cover-member 2 preferably has on its inner face, near the top thereof, a photograph-receiving space 5 for the placement thereon of the photograph 6 of the ticket-purchaser. Subjoined to the photograph, but independent thereof, and mounted on the inner face of the same cover-member, is a contract 7, preferably printed, and which includes, inter alia, a covenant or clause which specifically refers to the photograph appearing above the contract and to the signature of the purchaser subscribed in a signature-receiving space 8 at the end of the contract. This contract also includes a covenant or clause to the effect that the associated ticket is valid only during the calendar month specified on its face. At the time of issuance of this cover-component and after the purchaser has affixed his or her photograph thereon, the ticket agent impresses a dating-stamp 7ª on the photograph and contract, after which it is impossible for the purchaser of the ticket to substitute a different photograph. In this way, also, the photograph and subjoined contract are additionally connected together.

The other cover-member 3 of the holder is formed with a pocket 9 for a purpose presently to be explained. On the face of the pocket-component of the holder is printed, or otherwise impressed, certain identifying substance-matter. In the embodiment of the invention here disclosed, this identifying matter appears printed on a lable 10, bearing the name of the railroad which sells the ticket, likewise the designation of the associated ticket as a "monthly commutation ticket," likewise the stations of the railroad between which the ticket is usable, and, lastly, the calender months of the year with year-receiving spaces 11 and ticket-number-receiving spaces 12 appearing, respectively, before and after the name of each month on the label.

As already set forth this invention includes two components, to-wit, the above-described holder 1, and an associable ticket 13, which will now be described:

The ticket of the type shown in Figs. 4ª and 4ᵇ includes a plurality of portions or sections, certain of which bear printed matter corresponding to or having a definite relation with that appearing on one or the other of the aforementioned faces of each cover-member. That is to say, this component includes a ticket-member 13, a tab-member 14, and one or more coupon-members 15–16. These various elements or portions are preferably integral one with the other, but are scarified at 17 so that they may be folded and in order that the coupons may readily be detached from the ticket-member.

The ticket-member preferably includes the name of the railroad, in the space 18; also the expression "monthly commutation ticket," as at 19, or some similar designating term; a signature-receiving space 20; a station-receiving space 21; a month-year space 22; and a ticket-number, such as at 23. The year of issuance of the ticket is preferably impressed thereon, as at 24. All of the foregoing preferably appears within a central space 25 formed by lines 26. Paralleling such lines is a second set of lines 27 to provide trip-indicating spaces 28. Preferably, and as shown, these trip-indicating spaces form a margin about the central space, and are adapted to be punched by a conductor in the usual manner.

The tab-element is so formed and is of such dimensions as readily to be inserted in the pocket 9 of the cover-member 3, and by reason of the fold, at 29, the ticket-component will have its printed face uppermost and aline with the photograph and contract on the cover-member 2. This brings the signature-receiving spaces at the end of the contract and adjacent the upper end of the ticket-member into juxtaposition. Hence, at a glance, the conductor may compare the signature at the end of the contract with the signature on the ticket and, at the same time, when punching the ticket, may compare the photograph attached to the cover-member 2 with the passenger. Thus, identification is readily established, and this follows all through the use of each of the monthly commutation tickets from the beginning of the year to the end as such tickets are successively, each month, replaced in the cover-member 3.

In Figs 5, 6, 6ª and 7, I have shown a modified form of ticket-component 32 which is usable with the cover-component already described: This component includes a card-element 33, on the upper face 34 of which is printed the name of the railroad, as at 35, the stations between which the ticket is to be used, as at 36, and the legend "Monthly commutation ticket", as at 37. On the opposite side 37ª of this card-element 33 appears the railroad company's name 38, the legend "Monthly commutation ticket" 39, a signature-receiving space 40, the stations 41, and month-year indications 42 and 43, respectively, and other usual printed matter.

Secured to the card-element, as by wire-staples 44, is an agent's stub 45, on which appears, inter alia, a signature-receiving space 46, the station-indications 47, etc. Underlying the stub 45 is a first-trip stub 48 which includes, among other data, a signature-receiving space 49, stamp-receiving space 50, and a "No. 1"-coupon 51.

This ticket-component 32, like the first-described ticket-component 13, is insertable in the cover-component and each contains common matter which constitutes an identifying combination.

In this instance, the two coupon-elements, integral with the ticket-member, are detachable, one being the "agent's stub" which includes a signature-receiving space 30, the names of the stations for which the ticket affords passage, the month-year indication 31, and the ticket-number, these corresponding with the month-year indications on the ticket-component as well as the ticket-number also appearing thereon. Between the "agent's stub" coupon and the ticket-member is a second coupon, bearing the month-year indication, the station-indications, and the ticket-number.

By the use of the instrumentalities constituting the holder-component in association with the ticket-component, it is possible for a railroad company to protect itself against use of the ticket by anyone other than the bona fide owner thereof; hence the prevention of substantial loss is effected.

While I have herein described the two components as constituting an entity, when they are in the hands of a purchaser; nevertheless, it is to be understood that each of the components is separable one from the other in order to enable replacement of the ticket-component in the holder-component from time to time as the railroad company issues the same.

What I claim is:

1. A ticket-structure including a holder-component comprising a plurality of cover-members hinged together, one of the members having on one of its surfaces a photograph-receiving space and with a delineated signature-receiving space for identifying ownership of the structure with its owner, another of the cover-members having on one of its surfaces the name of the railroad which issues the ticket-structure, the names of railroad-stations, a column of year-designations, a column of month-designations, and a column of delineated ticket-number receiving spaces; in combination with a ticket-component attachable to the holder-component and provided with a delineated signature-receiving space adapted to receive the same signature as appears on the holder-component.

2. A ticket-structure including a holder-component comprising a plurality of cover-members hinged together, one of the members having on one of its surfaces a photograph-receiving space and with a delineated signature-receiving space for identifying ownership of the structure with its owner, another of the cover-members having on one of its surfaces the name of the railroad which issues the ticket-structure, the names of railroad-stations, a column of year-designations, a column of month-designations, and a column of delineated ticket-number receiving spaces; in combination with a ticket-component attachable to the holder-component and provided with a delineated signature-receiving space adapted to receive the same signature as appears on the holder-component and with a ticket-number, entry of which is made in one of the said ticket-number receiving spaces on the cover-component.

3. A ticket structure including a holder-component comprising two cover-members, and a hinge-section connecting the members, the holder-component having on one of its surfaces a printed contract and being provided with a photograph-receiving space, and with a delineated signature-receiving space juxtaposed to the contract; in combination with a ticket-component attachable to the holder-component and provided with a delineated signature-receiving space and a year-indication, a ticket-number, and appropriately-designated marginal trip-punch spaces.

4. A ticket structure including a holder and a ticket-component attachable to the holder-component; the holder-component comprising cover-members joined by a hinge-section; one of the cover-members carrying on its inner face a printed contract and provided with an identifying photograph-receiving space and a delineated signature-receiving space and carrying on another of its faces station-indications, the names of the calendar months, and ticket-number receiving spaces; the ticket-component being provided with a delineated signature-receiving space, with station-indications, with month-year indications, and a ticket-number to correspond with that noted after one of the calendar months on the holder-component.

5. A ticket structure including a holder-component and a ticket-component attachable to the holder-component; the holder-component comprising two cover-members and a hinge-section connecting the two members, one of the members being provided on its inner face with a photograph-receiving space and carrying a printed contract provided with a delineated signature-receiving space; the other cover-member being formed with a ticket-attaching pocket and provided with a label having station-indications, names of the calendar months, and ticket-number-receiving spaces adjacent the names of the months; the ticket-component being provided with a delineated signature-receiving space adapted to be juxtaposed to the signature-receiving space of said contract, with station-indications, month-year indications, and a ticket-number.

6. A ticket structure including a holder-component and a ticket-component attachable to the holder-component; the holder-component comprising two cover-members and a hinge-section connecting the two members, one of the members being provided on its inner face with a photograph-receiving space and carrying a printed contract provided with a delineated signature-receiving space; the other cover-member being formed with a ticket-attaching pocket and provided with a label having station-indications, names of the calendar months, and ticket-number-receiving spaces adjacent the names of the months; the ticket-component being provided with a delineated signature-receiving space adapted to be juxtaposed to the signature-receiving space of said contract, with station-indications, month-year indications, a ticket-number, and appropriately designated trip-punch spaces at the margin of the ticket-member.

7. A ticket structure including a holder-component and a ticket-component attachable to the holder-component; the holder-component comprising two cover-members and a hinge-section connecting the two members, one of the members being provided on its inner face with a photograph-receiving space and carrying a printed contract provided with a delineated signature-receiving space; the other cover-member being formed with a ticket-attaching pocket and provided with a label having station-indications, names of the calendar months, and ticket-number-receiving spaces adjacent the names of the months; the ticket-component being provided with a delineated signature-receiving space adapted to be juxtaposed to the signature-receiving space of said contract, with station-indications, month-year indications, a ticket-number, and appropriately designated trip-punch spaces at the margin of the ticket-member, and detachable coupons carried by the ticket-member and each bearing the number on the ticket-member, the station-indications, and month-year indications appearing on the ticket-member.

8. A ticket structure including a holder-component and a ticket-component attachable to the holder-component; the holder-component comprising two cover-members and a hinge-section connecting the two members, one of the members being provided on its inner face with a photograph-receiving space and carrying a printed contract provided with a delineated signature-receiving space; the other cover-member being formed with a ticket-attaching pocket and provided with a label having station-indications, names of the calendar months, and ticket-number-receiving spaces adjacent the names of the months; the ticket-component being provided with a delineated signature-receiving space adapted to be juxtaposed to the signature-receiving space of said contract, with station-indications, month-year indications, a ticket-number, and appropriately designated trip-punch spaces at the margin of the ticket-member, and detachable coupons carried by the ticket-member and each bearing the number on the ticket-member, the station-indications, and month-year indications appearing on the ticket-member; the coupon-members being foldable under the ticket-member, the latter carrying a tab-member insertable in the pocket of the holder.

9. A ticket-structure including a holder-component comprising a plurality of cover-members hinged together, one of the members having on one of its surfaces a printed contract containing conditions affecting use of the ticket-structure, said cover-component being provided with a photograph-receiving space and with a delineated signature-receiving space for identifying ownership of the structure with its owner, another of the cover-members having on one of its surfaces the name of the railroad which issues the ticket-structure, the names of the railroad-stations, a column of year-designations, a column of month-designations, and a column of delineated ticket-number receiving spaces; in combination with a ticket-component attachable to the holder-component and provided with a delineated signature-receiving space adapted to receive the same signature as appears on the holder-component.

In testimony whereof I affix my signature in presence of two witnesses.

LOREN F. VOSBURGH.

Witnesses:
HARRY PARRY,
IRVING M. TAYLOR.